(No Model.) 2 Sheets—Sheet 1.
N. C. LOCKE.
STEAM PRESSURE APPARATUS.
No. 393,164. Patented Nov. 20, 1888.
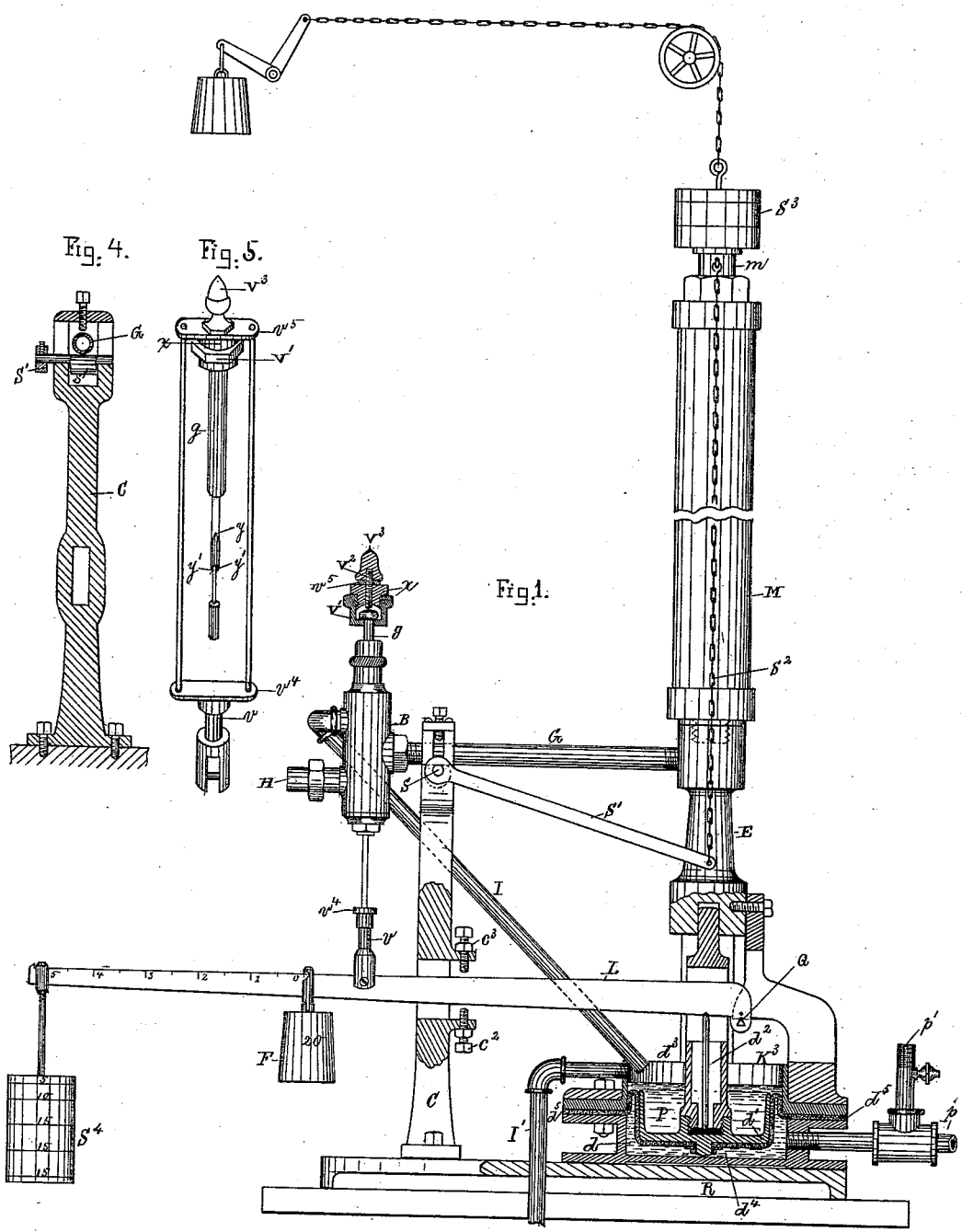
Witnesses.
J. E. Maynadier
Edward S. Beach
Inventor
Nathaniel C. Locke (No Model.) 2 Sheets—Sheet 2.
N. C. LOCKE.
STEAM PRESSURE APPARATUS.
No. 393,164. Patented Nov. 20, 1888.
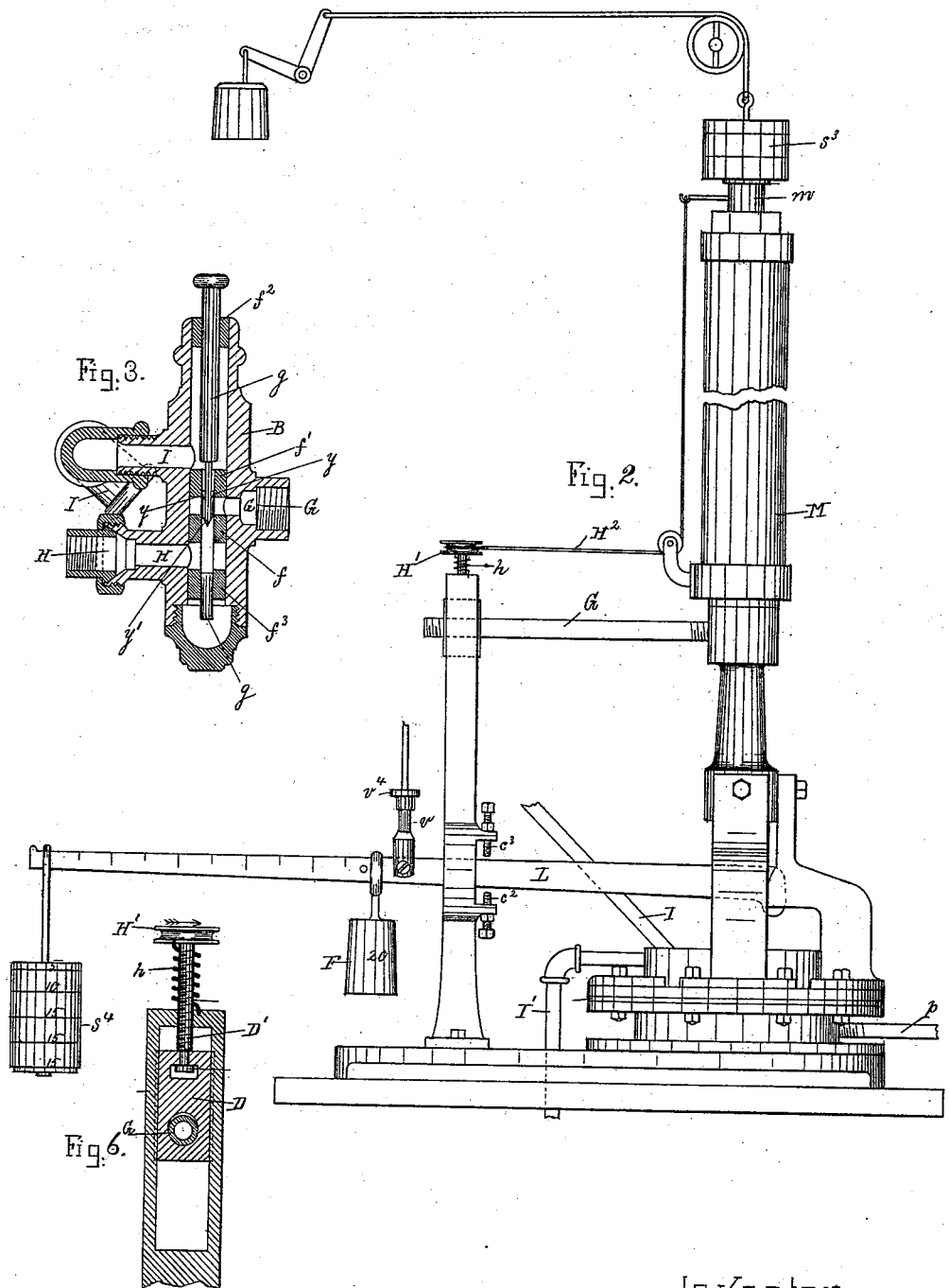
Witnesses.
J. E. Maynadier.
Edward H. Beach.
Inventor.
Nathaniel C. Locke.

UNITED STATES PATENT OFFICE.

NATHANIEL C. LOCKE, OF SALEM, MASSACHUSETTS.

STEAM-PRESSURE APPARATUS.

SPECIFICATION forming part of Letters Patent No. 393,164, dated November 20, 1888.

Application filed September 22, 1887. Serial No. 250,402. (No model.)

*To all whom it may concern:*

Be it known that I, NATHANIEL C. LOCKE, of Salem, in the county of Essex and State of Massachusetts, have invented an Improved Steam-Pressure Apparatus, of which the following is a specification, reference being had to the accompanying drawings, in which—

Figure 1 is a side elevation, partly in section, of the preferred form of my apparatus. Fig. 2 is a side elevation of my apparatus modified in form. Fig. 3 is a sectional detail illustrating the construction of the valve. Fig. 4 is a sectional detail illustrating the cam for giving a slight motion to the valve-casing. Fig. 5 is a perspective illustrating the connection between the lever and the valve-spindle. Fig. 6 is a sectional detail illustrating the screw device for giving a slight motion to the valve-casing.

My invention is an improvement upon the machine patented to me January 26, 1886, No. 335,080; and it consists, first, in a pressure-weighing device having a scale-beam to which the pressure is applied between the weights and the fulcrum of the scale-beam, and which has two sets of weights, one of which can be moved along the scale-beam to determine accurately the precise pressure per square inch, while the other is near the end of the scale-beam, or which lever is otherwise properly counterbalanced and scaled so as to be used like an ordinary steam-gage, the main novelty of this part of my invention residing not merely in the proper counterbalancing and scaling of the lever, but in the combination of such a lever with a diaphragm and its chamber and a piston supported by the diaphragm, in which the bearing which connects the lever and the diaphragm has its lower end below the flange by which the diaphragm is clamped to its chamber.

I have discovered that in order to use a diaphragm counterbalanced by a weighted lever as an accurate gage or weighing device it is essential that the diaphragm shall be cupped, substantially as shown in the drawings, in order to bring the lower end of the strut which connects the lever and piston of the diaphragm below the plane occupied by the flange of the diaphragm.

In the drawings the two castings $d$ $d^3$ form a chamber for the diaphragm $d^5$, this main chamber being divided, of course, by the diaphragm $d^5$ and its piston $d'$ into two chambers, $d^4$ and P. The chamber $d^4$ is in connection with the boiler or other source of pressure to be weighed through pipe $p$. Pipe $p'$ is for use to connect an ordinary steam-gage for the purpose of testing that gage or comparing its performance with that of my steam-weigher. The steam-pressure is communicated to the diaphragm $d^5$ by the water which fills chamber $d^4$, and tends to move diaphragm $d^5$ and its piston $d'$ upward and, through the strut $d^2$, to move lever L on its fulcrum Q. If the weights $S^4$, together with the weight F, exceed the upward pressure, the lever L will rest against the stop $c^2$. Then, if the weight F be moved in to the zero-mark on the scale of the lever L, and it still be found that the weights $S^4$ are too great, one or more of them are removed until the lever L leaves the stop $c^2$, when the weight F is adjusted until the lever L stands midway between the stops $c^2$ $c^3$, as in Fig. 1, in which the apparatus is shown as weighing a pressure of $15 \times 3 = 45 + 10 + 5 = 60 + 20 = 80$ pounds to the square inch. In the machine shown the weight F, when at zero on the scale of lever L, and the pendant without the weights $S^4$ in its place at the end of lever L, will just counterbalance a pressure of twenty pounds to the square inch, and the scale is so marked that when the weight F is moved out the apparatus will exactly counterbalance an increased pressure according to the position of weight F on the scale of lever L. The weights $S^4$ are in that case multiples of five.

I have found that by combining the piston of a roller-diaphragm and a counterbalanced lever by means of a loose connection—such, for example, as the strut $d^2$—and arranging these parts so that the connection between the lever and the piston of the diaphragm is carried at its lower end well below the flange by which the cupped or roller diaphragm is clamped to its chamber, I can produce a pressure-weighing device which, when carefully made, is sufficiently accurate to serve as a practical test for steam-gage, and this is an important feature of my invention.

Another use of my pressure-weighing device is to control a delicate valve, through which valve water under pressure is admitted to a cylinder, the piston of which controls a damper or the like, as more fully described in my patent above referred to, and another feature of my invention is the combination of my pressure-weighing device with such a valve.

In the drawings, B represents the valve, the same in general construction as that shown in my patent before referred to, but with these improvements in construction, which are features of my present invention, viz: The shell is bored to receive a series of rings, $f\, f'\, f^2\, f^3$, and these rings are a driving fit within the bore. After the rings are driven into place they are reamed to receive the valve-spindle $g$, as shown in Fig. 3. The smaller cylinder, forming part of the valve-spindle $g$, is cut away on two sides near its junction with the larger cylinder, and also cut away on two sides at some distance below, the first pair of cuts being preferably at right angles to the second, as shown in Fig. 3. The cylinder thus left between the two cut-away parts is longer than the distance between the rings $f\, f'$, but is filed off to form V-shaped projections $y\, y'$, as shown in Figs. 3 and 5. The purpose of this is that the cylindrical portion between the two cut-away places never wholly leaves the rings $f\, f'$, thus always keeping the axis of the valve $g$ coincident with the axis of the rings $f\, f'$, and yet allowing sufficient flow of water from pipe G through the exhaust, which is the central hole through ring $f'$, when the valve is in the position shown in Fig. 3, or a flow from H through the inlet-port, which is the central hole through ring $f$, when the valve $g$ is in the position opposite to that shown in Fig. 3, for, as will be clear without detailed description, the valve in one position connects G with the exhaust I, and in the other position allows the water to flow from the pressure-pipe H into the pipe G, which connects with the motor M.

Another feature of my invention relates to devices for connecting valve-spindle $g$ with the lever L, and consists in a yoke connected, substantially as shown in Fig. 5, with the valve-spindle $g$. The hole through the yoke V' is larger than that part of the valve $g$ which lies in it, so as to allow a slight motion of the yoke on the ball or knob which forms the outer end of the valve-spindle $g$. A plug, X, is secured into yoke V', and through this plug X the screw V² passes, which is adjusted so that it is very nearly in contact with the ball on the end of valve-spindle $g$. The upper part of screw V² passes through the cross-piece $v^5$ of the yoke, and check-nut V³ binds together the yoke V', plug X, and cross-piece $v^5$, whereby valve-spindle $g$ is held to the yoke, but not so rigidly as to tend to make the valve-spindle $g$ cramp in its case B. The lower cross-piece, $v^4$, of the yoke is connected in the usual manner by the forked stem $v$ to the lever L. As will be clear, the cross-piece $v^5$ and the plug X may be integral instead of in two pieces, as shown in Fig. 1. These details of construction as to valve B $g$ and its connection with the lever, while seemingly of trifling importance, are yet very material, so far as concerns the accurate operation of the steam-weighing apparatus, for it is essential that the work done by the lever L shall be reduced to the minimum if the pressure-weighing device of which the lever L is the scale-beam is to do its work with anything like accuracy.

For extreme closeness of operation, when the apparatus and its valve B are used as a damper-motor to regulate the pressure of steam in the boiler, it is desirable to modify the action of the valve by slightly moving the casing B of the valve, and in order to accomplish this the piston-rod $m$ of the motor M is connected to a cam or the like, so that the motion of the piston of the motor M is imparted in part to the casing of the valve. This part of my invention will be clear from the following example: Suppose the valve to have a lap of one thirty-second of an inch, so that the motion of the valve-spindle $g$ must be, say, one thirty-second to clear the lap and one sixty-fourth to afford a passage through which water can flow into cylinder M fast enough to give a slow motion to the piston-rod $m$. Such a motion of the valve would ordinarily move the piston about an inch in from five to ten seconds, and the piston might move at that rate for about three inches, and if there were no change in the boiler-pressure the piston would keep on moving at that rate to the end of its stroke; but on some boilers it is desirable to prevent this full stroke of the piston unless there be so great a rise in the boiler-pressure as to require it, and for that reason in Fig. 1 I have shown the piston-rod $m$ of the damper-motor connected to lever S', which is fast to the shaft of cam S, which cam is under pipe G, to which valve-casing B is fast, and the cam S is so shaped that as the piston-rod $m$ is moved by the water entering the cylinder M after valve-spindle $g$ has been moved, as above supposed, by lever L, the motion of the piston $m$ springs pipe G and the valve-casing B upward, and thereby closes the valve and shuts off the further supply of water, this taking place when the piston-rod $m$ has moved, say, one-half its stroke. If, then, the pressure in the boiler continues to rise, the valve-spindle $g$ will be opened still farther by the lever L and more water admitted to the cylinder M until the piston-rod $m$ makes its full stroke and completely closes the damper. If, on the other hand, the steam-pressure in the boiler should not rise more than enough to move the valve-spindle $g$, say, three sixty-fourths of an inch, then the piston-rod $m$ will stop rising as soon as the lever S' has caused cam S to spring pipe G far enough to close the inlet-port of the valve by the motion of the casing B over valve-spindle $g$, and the damper will be held only partially closed. Should the boiler-pressure then decrease slightly, the valve-spindle $g$ will be moved in the opposite direction by lever L, thus allowing the water to flow back through the pipe G and out through exhaust I, which permits piston-rod m to descend slowly under the influence of the weight S³, thereby opening the damper.

It will be obvious that piston-rod m may be connected by a variety of mechanical means to valve-casing B. While I prefer the cam S and lever S', yet screw D' and slide D are under some circumstances better. As will be clear from the drawings, the screw D' is revolved in one direction by cord H², wrapped around the grooved block H', fastened to screw D', and in the other direction by spring h, which rewinds cord H². This feature of my invention is important where the variation of the boiler-pressure is desired to be kept at the minimum, for the reason that if the boiler-pressure should in any case tend to rise rapidly then the upward motion of the valve-casing B is not sufficient to cause it to travel over the valve-spindle g and close the inlet-port, for the rapid increase of pressure will move lever L far enough to keep the inlet open, and so of any rapid decrease of pressure; but where the increase or decrease is not rapid then the valve-spindle g will first move slightly to open the inlet, and the motion of the piston-rod m caused by opening the inlet will move the casing B so as to close the inlet, when a slight decrease of pressure will open the outlet, or a further slight increase will open the inlet a second time. In practice it frequently happens that the piston-rod m will move slightly up, then slightly down, then slightly up again, and so on, as it were, feeling for that position of the damper which would best regulate the boiler-pressure.

My improved machine is mainly designed for use as a damper-regulator or as a contrivance to prevent, as far as may be done by manipulating the damper, variation in the boiler-pressure, and also waste of fuel, and, as my steam-weighing apparatus is actuated by a very slight rise or fall of the boiler-pressure, my machine responds instantly to any rise in the boiler-pressure, whether that rise be slow or rapid, and either partly or wholly closes the damper by reason of the connection between the piston-rod of the damper-motor and the casing of the valve—that is to say, my machine will always close the damper as far as it can be closed whenever the rise of pressure is rapid, or will only partially close the damper if the rise of pressure be not rapid, and so, as to opening the damper, if the pressure fall rapidly—that is, one-half pound or less in a few seconds—the damper will be opened wide by my improved machine, while if the pressure fall slowly—that is, one-half pound or less in half a minute or more—the damper will be only partially opened. In other words, the most perfect automatic regulation of the boiler-pressure by means of the damper depends upon these two things: first, the extreme accurateness and sensitiveness of the steam-weighing apparatus, and, secondly, upon the motion of the valve-casing in the same direction that the valve-spindle moves.

Another feature of my invention consists in connecting the exhaust-pipe I from the valve with the chamber P above the diaphragm, which chamber has an outlet, I', whose mouth opens into chamber P at a point sufficiently high to keep the diaphragm $d^5$ always covered with water. This preserves the diaphragm, and not only makes it last much longer, but also makes it more efficient in operation.

I am aware of English Patent No. 734 of 1862, and disclaim all that is set forth in it.

What I claim as my invention is—

1. In combination, the pressure-weighing device, with its diaphragm projecting downward, as specified, the balanced valve B g, and the motor M, substantially as described.

2. In combination with the pressure-weighing device and the valve controlled by it, motor M and means, substantially such as described, (e. g., cam s, lever s', and chain s²,) for connecting the piston m of the motor M to the casing B of the valve and causing the casing to follow up the movement of the valve, all substantially as and for the purpose specified.

3. In combination, valve g and valve-casing B, provided with one or more removable rings, $f f' f^2 f^3$, which are fixed in the interior of the casing, arranged and operating substantially as described.

4. In combination, valve-casing B and valve g, having the V-shaped projections y y', substantially as and for the purpose set forth.

5. In combination with the pressure-weighing apparatus, its valve and motor, the exhaust-pipe L, connecting the valve-casing B with chamber P above the diaphragm of the pressure-weighing apparatus, and overflow I', leading from chamber P, all substantially as described.

6. Valve-casing B and valve g, in combination with the valve-spindle yoke, the spindle and the yoke being loosely connected, to operate substantially as described.

7. In combination with a motor, M, and a valve, B, for operating said motor, a pressure device and its lever which is connected to the valve B for operating the motor, the lever of the pressure device being a scale-beam, substantially as set forth.

NATHANIEL C. LOCKE.

Witnesses:
J. E. MAYNADIER,
EDWARD S. BEACH.